United States Patent
Bryant et al.

(10) Patent No.: US 6,575,405 B2
(45) Date of Patent: Jun. 10, 2003

(54) CONTROL SYSTEM AND METHOD FOR A SEMI-LEVERED LANDING GEAR FOR AN AIRCRAFT

(75) Inventors: Malcom S. Bryant, Maple Valley, WA (US); Thomas R. Hasenoehrl, Stanwood, WA (US); Jerome R. Kilner, Bellevue, WA (US); Gary M. Lindahl, Newcastle, WA (US); Taiboo Song, Bothell, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 10/126,226

(22) Filed: Apr. 19, 2002

(65) Prior Publication Data

US 2003/0033927 A1 Feb. 20, 2003

Related U.S. Application Data

(60) Continuation-in-part of application No. 09/716,760, filed on Nov. 20, 2000, now Pat. No. 6,345,564, which is a division of application No. 09/281,457, filed on Mar. 30, 1999, now Pat. No. 6,182,925.

(51) Int. Cl.[7] ............................................. B64C 25/26
(52) U.S. Cl. ........................... 244/102 SL; 244/102 SS
(58) Field of Search ........................ 244/102 R, 102 A, 244/102 SL, 102 SS, 104 FP

(56) References Cited

U.S. PATENT DOCUMENTS

| 3,073,586 | A |   | 1/1963  | Hartel          |           |
|-----------|---|---|---------|-----------------|-----------|
| 3,322,376 | A | * | 5/1967  | Neilson et al.  | 244/102 R |
| 4,199,119 | A | * | 4/1980  | Masclet         | 244/102 SS|
| 4,359,199 | A |   | 11/1982 | Kramer et al.   |           |
| 4,381,857 | A |   | 5/1983  | Cook            |           |
| 4,749,152 | A |   | 6/1988  | Veaux et al.    |           |
| 4,892,270 | A |   | 1/1990  | Derrien et al.  |           |
| 4,940,197 | A |   | 7/1990  | Putnam          |           |
| 5,094,407 | A |   | 3/1992  | Jampy et al.    |           |
| 5,110,068 | A |   | 5/1992  | Grande et al.   |           |
| 5,158,267 | A |   | 10/1992 | Pascal          |           |
| 5,299,761 | A |   | 4/1994  | Robin et al.    |           |
| 5,429,323 | A |   | 7/1995  | Derrien et al.  |           |
| 5,460,340 | A |   | 10/1995 | White           |           |

FOREIGN PATENT DOCUMENTS

| EP | 0 246 949 A1 | 11/1987 |
| EP | 0 295 174 A1 | 12/1988 |
| EP | 0 328 395 A2 | 8/1989  |
| GB | 1006522      | 10/1965 |
| GB | 1 510 554    | 5/1978  |
| GB | 2 101 542 A  | 1/1982  |

* cited by examiner

Primary Examiner—Robert P. Swiatek
(74) Attorney, Agent, or Firm—Alston & Bird LLP

(57) ABSTRACT

A control system for controlling a tiltable wheel truck of a main landing gear includes an auxiliary strut, a ground mode system operably connected with the aircraft for detecting and providing signals indicative of when the aircraft is on the ground; a takeoff mode system operably connected with the aircraft for detecting and providing signals indicative of when the aircraft is operating in a throttled-up mode; and an auxiliary strut control unit operably connected with the ground mode system, takeoff mode system, and auxiliary strut. The auxiliary strut control unit is operable to issue a lock-up command signal to the auxiliary strut upon detecting signals from the systems indicating that the aircraft is on the ground and that the aircraft is operating in a throttled-up mode, whereby the auxiliary strut is caused to lock up during a takeoff roll but is unlocked during other operating modes of the aircraft.

27 Claims, 9 Drawing Sheets

CONTROL SYSTEM AND METHOD FOR A SEMI-LEVERED LANDING GEAR FOR AN AIRCRAFT

CROSS-REFERENCE TO RELATED APPLICATION

The present application is a continuation-in-part of U.S. patent application Ser. No. 09/716,760 filed Nov. 20, 2000, now issued as U.S. Pat. No. 6,345,564, which is a divisional of U.S. patent application Ser. No. 09/281,457 filed Mar. 30, 1999, now issued as U.S. Pat. No. 6,182,925.

FIELD OF THE INVENTION

The present invention relates generally to aircraft landing gear, more particularly to semi-levered landing gear, and most particularly to a control system for controlling a landing gear such that semi-levered functionality is achieved at selected operating conditions.

BACKGROUND OF THE INVENTION

In most large commercial aircraft, the maximum rotation angle of the aircraft during takeoff and landing is limited by a minimum permissible clearance between a rear under portion of the fuselage and the ground. It is known that the takeoff and landing performance of a given aircraft can be enhanced by providing a longer main landing gear about which the aircraft rotates to achieve a nose-up attitude, thereby increasing the maximum rotation angle of the aircraft. However, one of the objectives of aircraft design is to configure the landing gear so that the aircraft fuselage is essentially horizontal during ground operations and has an appropriate sill height for ground servicing. The maximum sill height that is acceptable is dictated by the height of ground equipment that must interface with the aircraft, and thus is generally fixed. In many cases, the maximum allowable sill height is less than what would be desirable from an aircraft performance standpoint, and therefore, merely lengthening the landing gear is not a viable approach to achieving increased maximum rotation angle. Further, landing gear length must be minimized to keep weight to a minimum and to facilitate the stowing of the gear during flight, and hence a wholesale lengthening of the landing gear is undesirable.

In view of the above considerations, efforts have been made to develop variable-length landing gear capable of assuming a length that is suitable for stowing within the aircraft, and for ground operations while the aircraft is on the ground and stationary, and further capable of assuming a greater length during takeoff and landing operations. One such type of variable-length landing gear, to which the present invention relates, is the semi-levered landing gear (SLG). In a typical SLG, a wheel truck is formed by a bogie beam supporting forward and aft wheels at forward and aft ends thereof, and a main strut of conventional design is pivotally connected to the bogie beam at a main pivot between the forward and aft wheels. An additional mechanical linkage is connected at an upper end to the main strut and at a lower end to the bogie beam at an auxiliary pivot spaced from the main pivot for controlling positioning of the bogie beam. The additional mechanical linkage enables the bogie beam, under certain conditions, to pivot about the auxiliary pivot rather than the main pivot. In this manner, when the aircraft approaches the end of a takeoff roll and begins to rotate for liftoff, the bogie beam can be placed in a tilted orientation with the forward wheels off the ground with the aid of the additional mechanical linkage, which prevents the bogie beam from rotating to a horizontal orientation. With the wheel truck in this tilted position, the effective length of the landing gear is increased relative to its length when all wheels are on the ground. The aircraft can then rotate to a higher pitch attitude, with the same tail clearance, thus achieving improved takeoff performance.

Existing semi-levered landing gears can be unsatisfactory for various reasons. In some types of SLG configurations, such as that disclosed in U.S. Pat. No. 4,892,270 to Derrien et al., the additional mechanical linkage comprises a passive torque link assembly whose only function is to lock up when the main strut and the bogie beam assume particular positions, namely, when the bogie beam is tilted and the main strut is relatively uncompressed as it is on initial touchdown and at liftoff. These types of SLG devices require an additional actuator or spring device for placing the bogie beam in the tilted position for landing. Where the means for tilting the bogie beam is a passive spring device as in the Derrien '270 patent, stowing of the landing gear in the aircraft can be complicated by the lack of ability to reposition the bogie beam in a more-appropriate position for stowage.

One method that has been used to reposition the bogie for stowage with this type of SLG employs a shrink-link main strut that is operable to shorten as the landing gear is retracted into the wheel well, thereby changing the geometry of the SLG link and bogie so that the gear can be stowed. A disadvantage of this approach is that the shrink-link main strut is of considerably greater complexity and weight than a conventional main strut, thereby adding cost and weight to the aircraft.

Accordingly, some SLG configurations employ an active device connected between the main strut and the bogie beam for placing the bogie beam in a tilted position. For example, published UK Patent Application No. GB 2,101,542A by Putnam et al. discloses an aircraft undercarriage unit having a variable length oleopneumatic strut connected between the main strut and an aft end of the bogie beam. The variable length strut is hydraulically actuated to extend so as to tilt the bogie beam during takeoff. After takeoff, the variable length strut is contracted to position the bogie beam substantially horizontal to facilitate stowage of the gear. A major problem with Putnam's landing gear design is that it is incapable of maintaining equal loading on all main gear wheels during braking at all aircraft weight and aerodynamic lift conditions, because the variable-length strut is always active to exert a force on the bogie tending to tilt the bogie, which occurs when the overall load on the landing gear drops to a sufficiently low level. The result is that Putnam's landing gear would require larger brakes, and larger wheel wells to contain them, in order to assure adequate braking capacity during landing rollout or refused takeoff, thus incurring a significant penalty to the aircraft design in terms of weight and wheel well volume.

Another type of main landing gear is disclosed in UK Patent 1,510,554 by Faithfull. The Faithfull patent states as its object and advantage the capability of effectively lengthening the landing gear at touchdown to provide improved shock absorbing characteristics during landing at relatively high descent rates. The landing gear purportedly achieves this object by the use of an additional oil-filled cylinder, functioning only as a passive damper, pivotally attached to the front of the bogie beam and the upper stationary part of the main shock strut. In preparation for landing, the bogie is placed into a tilted position via a positioning device that is separate from the oil-filled cylinder. In this tilted position, the oil-filled cylinder is in a compressed condition. Upon touchdown and landing rollout, the bogie begins to rotate toward a horizontal position, thus causing the oil-filled cylinder to be extended until it reaches its maximum length. The maximum length of the oil-filled cylinder is such that the bogie cannot rotate to a fully horizontal position during the initial portion of the landing rollout, and hence the effective length of the landing gear is greater during this initial portion of the rollout.

Faithfull does not claim that his device is capable of providing improved takeoff performance through effective gear lengthening. Moreover, Faithfull's device would prevent the most advantageous positioning of the bogie for stowage of the gear in the aircraft. In order to stow the landing gear in most aircraft, the bogie advantageously should be placed in an approximately horizontal position (on some large commercial aircraft, the bogie must rotate past horizontal into a pitch-down attitude of as much as 15 degrees) with the main strut fully extended, this orientation enabling the wheel well size to be kept to a minimum. However, Faithfull's oil-filled cylinder has a maximum extension selected such that the bogie is tilted into a pitch-up attitude when the main strut is slightly compressed on landing. Thus, the oil-filled cylinder simply cannot extend sufficiently to position the bogie horizontal with the main strut fully extended. If the oil-filled cylinder disclosed in Faithfull were modified to provide sufficient stroke to accommodate the bogie stow position, it would be incapable of providing the semi-levered function on landing. Furthermore, if the stroke length were selected to provide effective semi-levered function on takeoff, then the bogie would assume a pitch-up attitude for stowage, which would require a very large wheel well. Thus, Faithfull's device is incapable of simultaneously providing semi-levered function and enabling an optimum positioning of the bogie for stowage.

A main landing gear configuration disclosed in U.S. Pat. No. 4,749,152 is said to provide an effectively longer landing gear at takeoff, but requires a very complex main strut having multiple main strut cylinders, some with offset loading. This main strut would result in a very heavy landing gear relative to a conventional main strut. Additionally, the landing gear in the '152 patent requires a shrink-link mechanism to reposition the bogie for stowage. Furthermore, the multiple-cylinder design results in sliding surfaces that cannot be inspected without major disassembly, thus increasing maintenance costs. Finally, another disadvantage of the gear design disclosed in the '152 patent is that all of the purported functions of the gear, including semi-levered action at takeoff, absorption of energy at touchdown, equal wheel loading during ground roll, and bogie repositioning, are provided by the main strut. This may hamper the optimization of each of these functions because of space and geometry limitations of the design.

To address the above-noted needs, the assignee of the present application developed a landing gear with an auxiliary strut as described in U.S. Pat. No. 6,182,925, the disclosure of which is hereby incorporated herein by reference. The '925 patent describes a semi-levered landing gear that includes a single auxiliary strut in conjunction with a main strut, which can be of conventional design, and a multiple-wheeled bogie. The auxiliary strut, in preferred embodiments, enables the landing gear to provide all of the desirable functions required of a main gear during aircraft operation, including:

(1) the ability to tilt the bogie to provide an effectively longer main landing gear during takeoff rotation and liftoff;

(2) the ability to reposition the bogie beam to an appropriate angle for stowing the landing gear;

(3) the ability to position the bogie beam to an appropriate pitch-up angle in preparation for landing after landing gear deployment, and thereby facilitate an early air-ground sensing upon initial ground contact of the aft bogie wheels;

(4) the ability to effectively decouple the auxiliary strut during static and ground-roll operations so as to facilitate equal loading of all main gear wheels and, accordingly, optimum braking ability; and (5) the ability to deactivate the functioning of the auxiliary strut that provides the semi-levered action when desired, such as during landing, so that the auxiliary strut acts as a damping device for partially absorbing touchdown loads such that the load transmitted to the aircraft is reduced.

To these ends, the semi-levered landing gear of the '925 patent comprises a wheel truck including a bogie beam and at least one forward wheel and at least one aft wheel rotatably supported by the bogie beam at forward and aft portions thereof, respectively, a main strut having an upper portion and a lower portion telescopingly connected to each other such that the main strut is extendable and compressible, the lower portion having a lower end pivotally connected to the bogie beam at a main pivot located between the forward and aft wheels, and an auxiliary strut having an upper end pivotally connected to the upper portion of the main strut and a lower end pivotally connected to the bogie beam at an auxiliary pivot longitudinally spaced from the main pivot. The auxiliary strut comprises a cylinder barrel having a closed end and an open end, a piston assembly slidably received through the open end of the cylinder barrel, and a lock-up device operable to permit extension of the piston assembly during a portion of a stroke thereof until the auxiliary strut reaches a predetermined lock-up length between a maximum length and a minimum length thereof. The lock-up device substantially prevents further extension of the piston assembly once the auxiliary strut reaches the predetermined lock-up length. The main strut and auxiliary strut are constructed and arranged relative to each other and the bogie beam such that, during takeoff as the main strut extends, the auxiliary strut becomes locked at the predetermined lock-up length before the main strut fully extends such that further extension of the main strut causes the bogie beam to pivot about the auxiliary pivot so as to tilt the bogie beam, whereby the landing gear is effectively lengthened. The main strut can be of conventional design; no shrink-link or other complex and heavy main strut is needed.

SUMMARY OF THE INVENTION

The present invention represents a further development of the technology embodied in the '925 patent. More particularly, the present invention relates to a control system and method for controlling a tiltable wheel truck of a main landing gear by employing an auxiliary strut that can be commanded to lock up at a predetermined length so as to cause the landing gear to function as a semi-levered gear. The control system and method in particular operate to cause the landing gear to function as a semi-levered gear during a takeoff roll; the auxiliary strut remains unlocked during other operating conditions so that, for example, the wheel truck is free to pivot during rollout following a landing, and during taxi such that the truck can pitch freely in response to runway surface roughness. The auxiliary strut is unlocked at touchdown also, so that the auxiliary strut can provide a damping function. Preferably, the auxiliary strut and control system can also provide a truck positioning function for placing the truck in a desired orientation. For example, the truck can be tilted into a pitched-up attitude for touchdown so that the aft wheels of the gear make first contact with the runway; furthermore, the truck can be pivoted to an orientation suitable for stowing the gear in the gear bay of the aircraft.

In accordance with one embodiment of the invention, a control system for controlling a tiltable wheel truck of a main landing gear includes an auxiliary strut, a ground mode sensor operably connected with the aircraft for detecting and providing signals indicative of when the aircraft is on the ground; a takeoff mode sensor operably connected with the aircraft for detecting and providing signals indicative of when the aircraft is operating in a throttled-up mode; and an auxiliary strut control unit operably connected with the ground mode sensor, takeoff mode sensor, and auxiliary strut. The auxiliary strut control unit is operable to issue a lock-up command signal to the auxiliary strut upon detecting signals from the sensors indicating that the aircraft is on the ground and that the aircraft is operating in a throttled-up mode, whereby the auxiliary strut is caused to lock up during a takeoff roll but is unlocked during other operating modes of the aircraft.

Preferably, the ground mode sensor comprises a weight-on-wheels sensor that detects when the main landing gear is bearing weight, thus indicating that the landing gear is in contact with the ground. The takeoff mode sensor preferably comprises an engine speed sensor operable to detect when any of the aircraft's engines is operating above a predetermined speed. This allows the control unit to distinguish between a takeoff condition at which the engines will be operating at a relatively high speed (e.g., greater than 60 percent fan speed) and a taxi condition or landing rollout at which the engines typically operate at a relatively low speed (e.g., less than 60 percent fan speed).

In order for the control unit to provide an immediate unlock signal to the auxiliary strut in the event of a refused takeoff (RTO), the takeoff mode sensor preferably also comprises a thrust lever sensor operable to detect when any of the thrust levers for the aircraft's engines is advanced beyond a predetermined limit, which indicates a throttled-up condition. Thus, if an RTO occurs during a takeoff roll and the thrust levers are chopped back to idle (i.e., below the predetermined limit), the auxiliary strut is immediately unlocked so that the load on the landing gear is evenly distributed to all wheels for maximum braking efficiency.

The takeoff mode sensor preferably also comprises a ground speed sensor operable to detect when the aircraft is traveling above a predetermined ground speed. In this manner, the control unit is able to distinguish between a takeoff roll and, for instance, a ground test of the engines in which the engines may be operating at a high speed. Thus, the auxiliary strut can remain unlocked unless the aircraft is actually rolling down the runway at an appreciable speed.

Preferably, the control unit is operable to unlock the auxiliary strut upon expiration of a predetermined time period following liftoff of the aircraft from the ground. Liftoff is indicated by a change of state of the signal from the weight-on-wheels sensor. Additionally or alternatively, if desired, the control unit can unlock the auxiliary strut immediately upon detecting that a command has been issued to retract the landing gear.

In accordance with another preferred embodiment of the invention, detection of whether the aircraft is on the ground or in the air is accomplished through use of radio altimeters mounted in the aircraft. Commercial aircraft typically have at least one and more typically three radio altimeters mounted in the aircraft at a location on the underside of the fuselage, usually just behind the nose gear. Such a radio altimeter emits radio signals downwardly, and the signals bounce off the ground and are reflected back up to the aircraft. The altimeter receives the reflected signal and computes the height of the altimeter from the ground based on the time delay between the sent and received signals. The altimeter is usually calibrated so that it reads zero when the main landing gear of the aircraft just touch down on landing, at which point the nose gear of the aircraft where the altimeter is located is still some distance off the ground. Thus, when the nose gear touches down and the aircraft is in a landing roll, the altimeter will read a negative height, about −8 to −10 feet, for example. In the preferred embodiment of the invention, the signal(s) from one or more radio altimeters is (are) used to determine whether the aircraft is on the ground or in the air.

For example, where there are three radio altimeters for redundancy, the control logic determines that the aircraft is on the ground if any of the following conditions is satisfied for a predetermined length of time (e.g., 5 seconds): (1) data from all three altimeters are available and any two altimeters indicate a height less than or equal to a predetermined lower limit (e.g., −5 feet); or (2) data from one or two altimeters are unavailable but at least one altimeter indicates a height less than or equal to the predetermined lower limit; or (3) data from all altimeters are unavailable. The on-ground condition remains true until the in-air logic is satisfied.

The control logic determines that the aircraft is in the air if any of the following conditions is satisfied for a predetermined length of time (e.g., 5 seconds): (1) data from all three altimeters are available and any two altimeters indicate a height greater than a predetermined upper limit (e.g., 15 feet); or (2) data from one or two altimeters are unavailable, and all available altimeters indicate a height greater than the predetermined lower limit and at least one altimeter indicates a height greater than the predetermined upper limit. The in-air condition remains true until the on-ground logic is satisfied.

In accordance with this embodiment, the auxiliary strut is commanded to lock if each engine is running, and flaps are in the takeoff position for more than a predetermined length of time (e.g., 2 seconds), and the aircraft is on the ground, and any engine power lever is advanced past a predetermined limit (e.g., 40 degrees). The command to lock remains until the unlock logic is satisfied.

The auxiliary strut is commanded to unlock if any of the following conditions persists for more than a predetermined length of time (e.g., 1 second): (1) the aircraft is in the air; or (2) each engine power lever is pulled back below the predetermined limit (e.g., 40 degrees) and the aircraft ground speed is greater than a predetermined limit (e.g., 60 knots); or (3) any engine is not running and the aircraft ground speed is less than the predetermined limit (e.g., 60 knots); or (4) all engines are not running; or (5) flaps are not in the takeoff position. The unlock command remains until the lock logic is satisfied, even if some of the above conditions are no longer satisfied.

This control logic provides robustness so that various failure modes can be tolerated while maintaining appropriate operation of the auxiliary strut.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
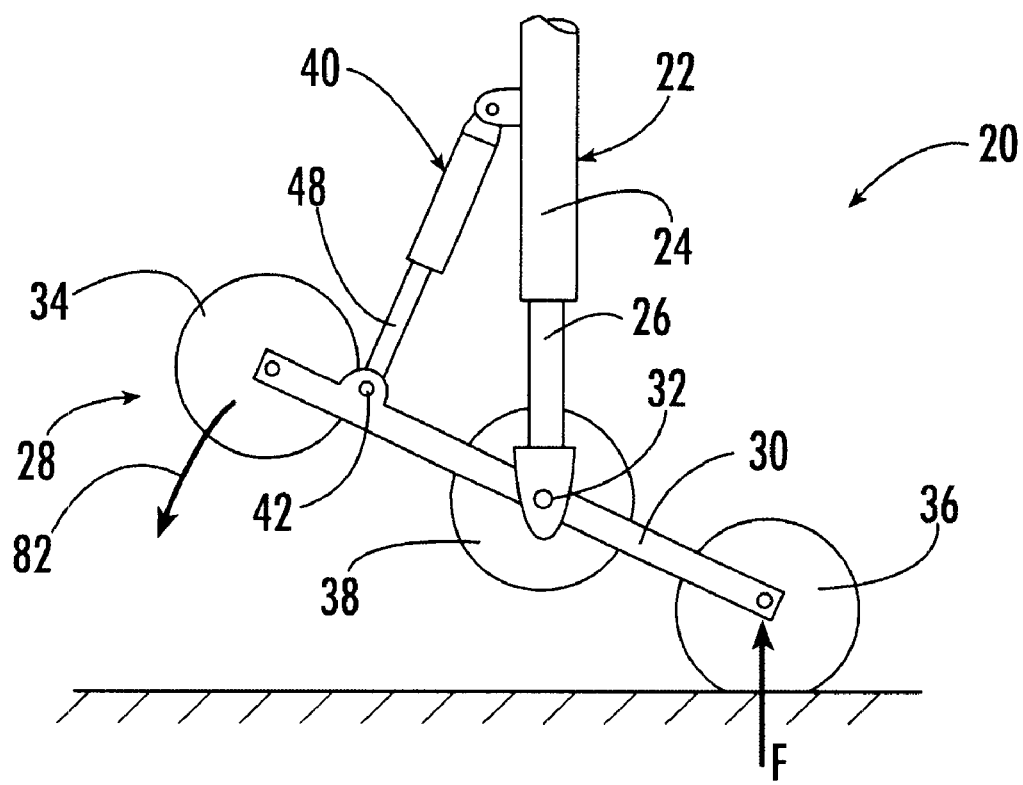
FIG. 1 is a schematic side elevation of a semi-levered landing gear in accordance with a preferred embodiment of the invention, showing the gear at initial touchdown when the aft wheel has just made contact with the ground or during takeoff rotation just prior to liftoff.

With reference to FIG. 1, a semi-levered landing gear 20 in accordance with a preferred embodiment of the invention is shown at initial touchdown. The gear 20 includes a main strut 22 of suitable construction to absorb and damp transient loads exerted between the gear and the ground during ground operations of an aircraft, and to support the aircraft when stationary on the ground. The main strut 22 typically includes a cylinder portion 24 and a piston portion 26 that is telescopingly received in the cylinder portion such that the length of the main strut 22 can vary depending on the amount of load applied to the landing gear in a direction along the axis of the main strut. On initial touchdown, as shown in FIG. 1, the amount of load applied to the landing gear 20 is relatively small and, accordingly, the length of the main strut 22 is essentially at a maximum.

The landing gear 20 further includes a wheel truck 28 formed by at least one bogie beam 30 pivotally attached at a main pivot 32 to a lower end of the piston portion 26 of the main strut, and a plurality of wheels rotatably supported by the bogie beam 30, including at least one forward wheel 34 and at least one aft wheel 36 respectively supported at a forward end and an aft end of the bogie beam 30. The wheel truck 28 shown in FIG. 1 may include one or more middle wheels 38 located at an intermediate position between the forward and aft wheels. In general, for most commercial passenger aircraft, the wheel truck of a main landing gear includes at least a pair of forward wheels journaled on an axle and a pair of aft wheels journaled on an axle, and some wheel trucks include a third middle pair of wheels journaled on an axle. However, the present invention is applicable to any wheel truck configuration having at least one wheel supported by a bogie beam at a location that is longitudinally displaced forward or aft of a main pivot at which a main strut is attached to the bogie beam.

The landing gear 20 also includes an auxiliary strut 40 that is pivotally connected at its upper end to the cylinder portion 24 of the main strut 22 and has its lower end pivotally connected at an auxiliary pivot 42 to the bogie beam 30 at a location forward of the main pivot 32. The auxiliary strut 40 is a variable-length device enabling the bogie beam 30 to pivot relative to the main strut 22. Additionally, the auxiliary strut 40 is capable of locking up to a fixed length, when suitably controlled as further described below, such that the bogie beam 30 is forced to pivot about the auxiliary pivot 42 rather than about the main pivot 32 so as to provide a semi-levered function to the landing gear 20.

Figure 2:
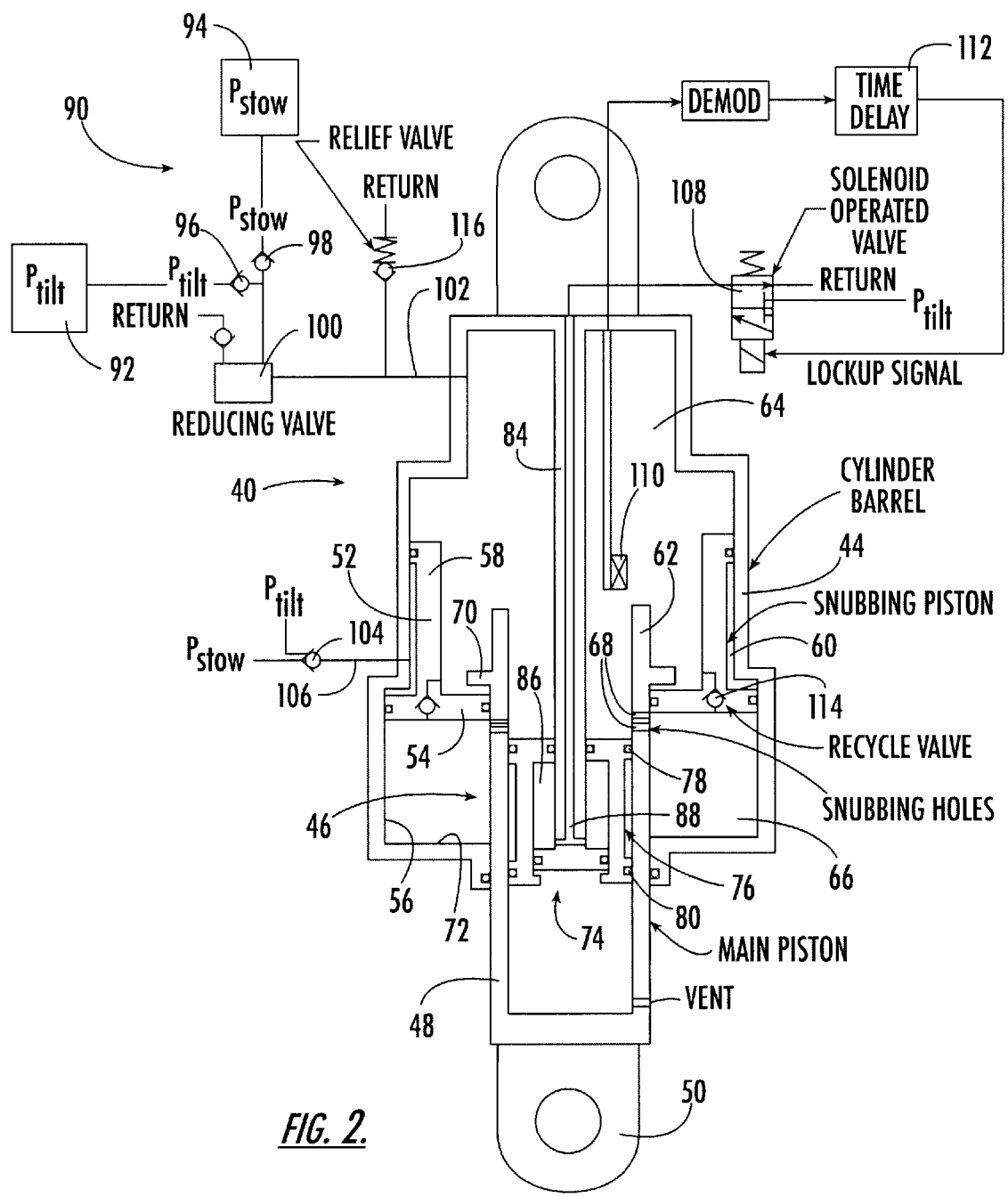
FIG. 2 is a schematic sectioned side elevation of an auxiliary strut in accordance with a preferred embodiment of the invention, showing the auxiliary strut in a retracted position for tilting the bogie beam of the semi-levered landing gear as shown in FIG. 1.

FIG. 2 depicts one preferred embodiment of the auxiliary strut 40 in greater detail. The strut 40 includes a cylinder barrel 44 and a piston assembly 46 slidably received through an open end of the cylinder barrel. The piston assembly 46 includes a main piston 48 having at least one lug 50 or other connecting member at its lower end for attachment to the bogie beam of a wheel truck, and a floating piston 52 that is entirely disposed within the cylinder barrel 44 and is slidable with respect to both the cylinder barrel 44 and the main piston 48. The floating piston 52 includes an end wall 54 whose outer periphery sealingly engages the inner cylindrical surface 56 of the cylinder barrel 44, and a generally cylindrical portion 58 that is attached to the end wall 54 and extends upwardly therefrom. The upper end of the cylindrical portion 58 sealingly engages the inner surface 56 of the cylinder barrel, and is configured such that a lengthwise extending part of the cylindrical portion 58 is spaced radially inwardly of the inner surface 56 of the cylinder barrel so as to create an annular floating piston control chamber 60 between the cylindrical portion 58 and the inner surface 56 of the cylinder barrel. As further described below, the floating piston control chamber 60 can be supplied with pressurized fluid, or alternatively can be evacuated, so as to extend or retract the floating piston 52 within the cylinder barrel 44 so as to vary the length of the strut 40 for rotatably positioning the bogie beam 30 of the landing gear shown in FIG. 1.

The end wall 54 of the floating piston 52 includes an aperture through which a tubular portion 62 of the main piston 48 is slidably received, and the inner periphery of the aperture sealingly engages the outer surface of the tubular portion 62. Thus, the end wall 54 of the floating piston 52 divides the interior of the cylinder barrel 44 into a pair of hydraulic chambers 64 and 66. The tubular portion 62 of the main piston 48 includes snubbing holes 68 extending therethrough so as to provide a fluid passage between the chambers 64 and 66. The tubular portion 62 further includes an annular flange 70 projecting outwardly therefrom adjacent an upper end of the tubular portion 62. When the flange 70 is in contact with the end wall 54 of the floating piston, forced extension of the main piston 48 from the cylinder barrel 44 causes the floating piston 52 to likewise be extended within the cylinder barrel. This movement of the floating piston 52 causes fluid to flow from the hydraulic chamber 66 through the snubbing holes 68 into the other hydraulic chamber 64. Conversely, if the floating piston 52 is retracted within the barrel 44, then as long as the flange 70 is in contact with the end wall 54, the main piston 48 is likewise retracted along with the floating piston 52, thus causing a reverse flow of fluid from the chamber 64 into the chamber 66. The snubbing holes 68 thus allow relatively free extension and contraction of the strut 40, and provide a degree of orifice-type damping dependent on the total flow area through the snubbing holes and the viscosity of the fluid.

Figure 3:
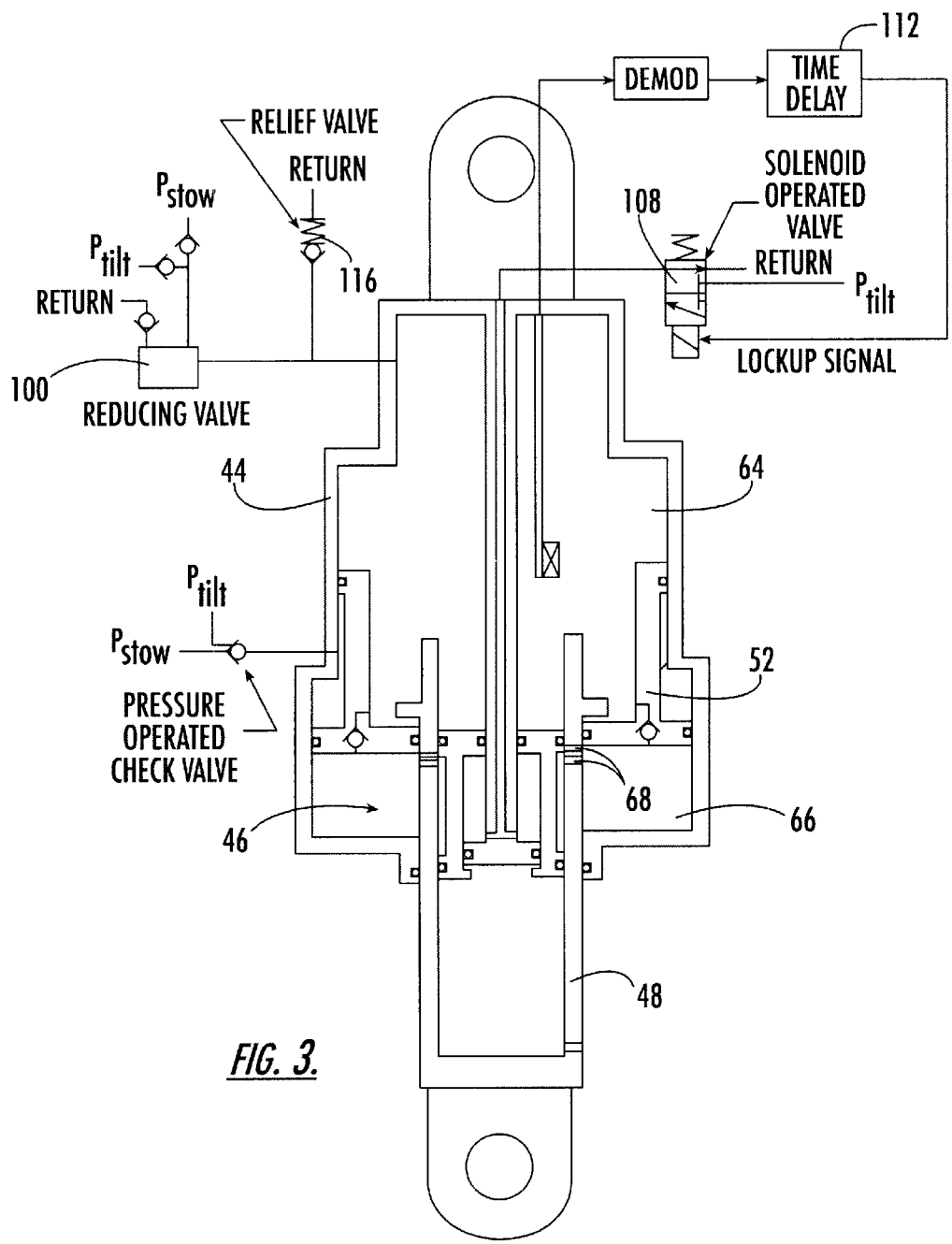
FIG. 3 is a sectioned side elevation similar to FIG. 2, showing the auxiliary strut in a lock-up position.

In accordance with the present invention, however, the snubbing holes 68 do not allow extension of the strut up to the mechanically limited maximum length thereof (which occurs when the floating piston 52 abuts the lower end stop 72 of the cylinder barrel 44 and the flange 70 of the main piston abuts the end wall 54 of the floating piston). Rather, the strut 40 includes a lock-up valve 74 that functions to close the fluid passage through the snubbing holes 68 when the strut reaches a predetermined lock-up length that is less than the maximum strut length. The lock-up valve 74 includes a valve member 76 that is disposed within the tubular portion 62 of the main piston 48 and sealingly engages the inner surface thereof at an upper end 78 of the lock-up valve and at a lower end 80 thereof spaced from the upper end 78. The main piston 48 is slidable relative to the valve member 76, which is operable to remain in a fixed location during extension of the piston assembly 46 of the strut. Accordingly, when the main piston 48 and floating piston 52 are extended from the generally retracted position shown in FIG. 2, during the initial portion of the extension stroke the snubbing holes remain open to allow fluid flow from the lower hydraulic chamber 66 to the upper hydraulic chamber 64. However, as the snubbing holes 68 are carried downward to and past the sealed upper end 78 of the lock-up valve member 76, as shown in FIG. 3, the snubbing holes are closed by the valve member 78 such that further flow of fluid between the chambers is prevented. The effect of this action is to lock the strut 40 at a predetermined lock-up length. It will be appreciated that the strut 40 can be configured to provide any desired lock-up length, by suitably proportioning the various components of the strut and appropriately locating the valve member 76 relative to the snubbing holes 68. It will be further appreciated that a progressive closing of the snubbing holes 68 can advantageously be provided by forming a series of snubbing holes 68 spaced lengthwise along the tubular portion 62 of the main piston so that damping of the strut extension progressively increases as the holes are progressively closed.

Figure 4:
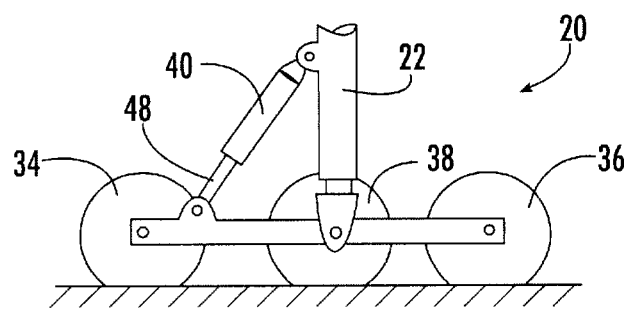
FIG. 4 is a view similar to FIG. 1, showing the landing gear in a ground static condition.

The lock-up capability of the strut 40 enables the landing gear 20 to function in a semi-levered fashion. More particularly, it is advantageous to construct the strut 40 such that when the floating piston 52 and main piston 48 are retracted to the positions shown in FIG. 2 on landing approach, the strut 40 causes the bogie beam 30 to be tilted into a nose-up position having the forward wheel 34 vertically higher than the aft wheel 36, as shown in FIG. 1. Thus, upon initial touchdown, the aft wheel 36 is the first to contact the ground. The ground load F exerted on the aft wheel 36 causes a pitching moment to be exerted on the bogie beam 30 tending to rotate the bogie beam toward a horizontal position, as indicated by arrow 82 in FIG. 1. Accordingly, the auxiliary strut 40 is placed in tension, and the main piston 48 and floating piston 52 are forcibly extended. As previously noted, the snubbing holes 68 are open during the initial portion of the extension stroke of the main piston 48 and floating piston 52, and thus the strut 40 allows the bogie beam 30 to rotate some amount, and provides viscous damping of the rotation of the bogie beam. This "lost motion" advantageously facilitates sensing of initial ground contact for other aircraft systems that are not a part of the present invention. It is advantageous to construct the strut 40 so that after a predetermined amount of bogie beam rotation but before all of the wheels contact the ground, the snubbing holes 68 become closed by the lock-up valve member 76 and the strut 40 locks up. Thus, for the initial portion of the landing roll, the landing gear 20 is effectively lengthened by the tilted orientation of the wheel truck 28. As the aircraft continues to lose speed during the landing roll, a greater and greater amount of the aircraft weight is exerted on the landing gear 20, and thus the main strut 22 is compressed more and more. Initially, the compression of the main strut 22 causes essentially no shortening of the auxiliary strut 40 and the bogie beam 30 pivots about the auxiliary pivot 42 until all of the wheels 34-38 are on the ground. Further compression of the main strut 22 then compresses the main piston 48 into the cylinder barrel 44 as shown in FIG. 4, and the main piston 48 separates from the floating piston 52 and is relatively freely compressed so that the landing gear 20 functions in a generally conventional manner.

Figures 5, 6:
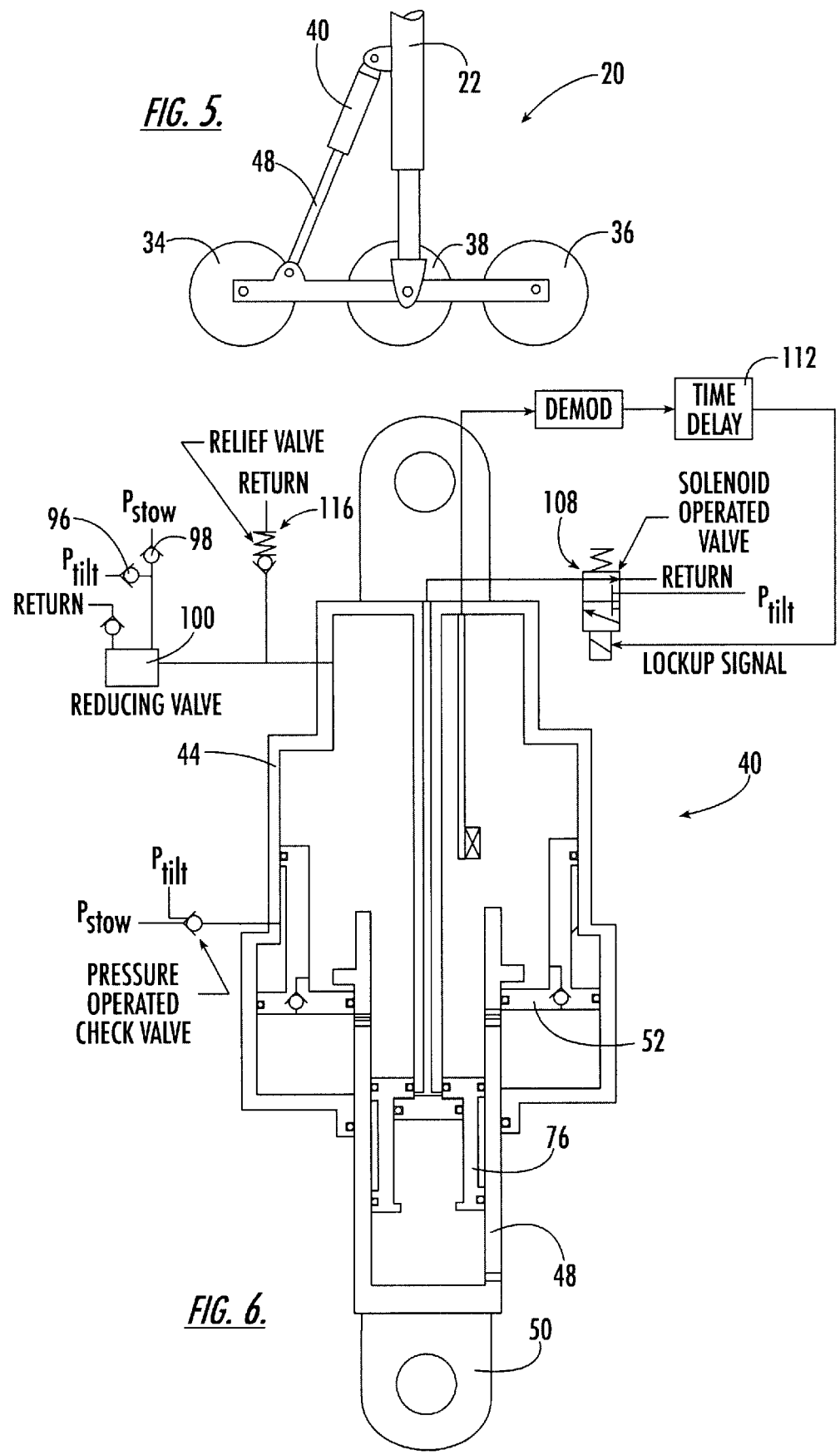
FIG. 5 is a view similar to FIG. 1, showing the bogie beam of the semi-levered landing gear in a stow position in preparation for the gear being stowed in an aircraft.
FIG. 6 is a view similar to FIG. 2, showing the auxiliary strut in a landing mode in which the lock-up valve member is extended to increase the lock-up length of the strut.

The auxiliary strut 40 in accordance with the present invention preferably has the capability of assuming two different lock-up lengths, one optimized for landing and one optimized for takeoff. In this manner, a greater amount of bogie beam rotation can be allowed on landing so that touchdown loads are absorbed and damped by the auxiliary strut before the strut locks up, while at takeoff the strut can lock up after a relatively short extension so as to enable a greater aircraft rotation angle. To these ends, the lock-up valve member 76 preferably is movable between a retracted position as shown in FIGS. 2 and 3 for providing a short extension before lock-up occurs, and an extended position as shown in FIG. 6 for providing a longer extension before lock-up occurs.

Advantageously, the valve member 76 is hydraulically actuated to move from one position to the other. The strut 40 includes a piston-type fluid supply member 84 fixed relative to the cylinder barrel 44 and extending into the interior of the tubular portion 62 of the main piston 48, and the lock-up valve member 76 sealingly surrounds the supply member 84 so as to define an annular lock-up control chamber 86 therebetween. The supply member 84 includes a fluid passage 88 that extends into the lock-up control chamber 86 for supplying pressurized fluid thereinto. Thus, the lock-up valve member 76 is acted upon on one side by fluid pressure within the upper hydraulic chamber 64 of the strut, and on the other side by fluid pressure within the lock-up control chamber 86. Accordingly, a pressure differential of one sense between the chamber 64 and the lock-up control chamber 86 will cause the valve member 76 to be retracted to the position of FIGS. 2 and 3, and a pressure differential of the opposite sense will cause the valve member 76 to be extended to the position of FIG. 6.

The landing gear and auxiliary strut in accordance with the present invention preferably includes a fluid supply system 90 operable to supply fluid at appropriate pressures to the various chambers of the strut 40 in order to effect movement of the lock-up valve member 76, and also to cause retraction of the floating piston 52 for tilting the bogie beam on landing approach and to extend the strut for positioning the wheel truck in a stowage position. The supply system 90 includes a source 92 of relatively high-pressure fluid at a pressure $P_{Tilt}$ and a source 94 of relatively high-pressure fluid at a pressure $P_{Stow}$, the sources 92 and 94 capable of being independently controlled to supply or shut off supply of fluid. The system 90 also includes a fluid return (not shown) such as a reservoir or the like, for return of fluid evacuated from the strut 40 so that the fluid can be recycled back to the fluid sources.

The fluid sources 92, 94 are connected through respective check valves 96, 98 to a pressure-reducing valve 100 operable to output fluid at a pressure between the supply pressure of sources 92, 94 and the fluid return pressure. The output of the pressure-reducing valve 100 is connected to a fluid passage 102 that extends into the upper hydraulic chamber 64 of the strut. The $P_{Stow}$ source 94 is connected through a pressure-operated check valve 104 to a fluid passage 106 that extends into the floating piston control chamber 60. The pressure-operated check valve is also connected to the $P_{Tilt}$ source 92 such that when the $P_{Tilt}$ source 92 is pressurized and the $P_{Stow}$ source 94 is depressurized, the pressure-operated check valve 104 opens and fluid is evacuated from the floating piston control chamber 60, thereby causing the floating piston 52 to be retracted as shown in FIG. 2. Valve 104 also acts to hold the floating piston 52 extended when the landing gear is retracted into the wheel well and all landing gear actuation system pressure is set to return. At the same time, pressure of the fluid in the upper hydraulic chamber 64, supplied from the pressure-reducing valve 100, causes the main piston 48 to stay in contact with the floating piston 52. Accordingly, the floating piston 52 causes retraction of the main piston 48, and the strut is contracted to a predetermined length. As previously noted, this length is preferably such as to place the wheel truck 28 of the landing gear in a tilted position, as shown in FIG. 1, in preparation for landing. This length of the strut is referred to herein as the "landing hold" position.

To control the position of the lock-up valve 74, the fluid supply system 90 in one embodiment includes an electrically operated solenoid valve 108 whose output is connected to the fluid passage 88 in the supply member 84. The solenoid valve includes a pair of inputs coupled to the $P_{Tilt}$ source 92 and to the fluid return. The solenoid valve 108 preferably is energized at takeoff so that the $P_{Tilt}$ pressure is directed through the fluid passage 88 to the lock-up valve 74, thereby retracting the valve member 76 so that the strut 40 locks up after a relatively short extension stroke. For landing, the solenoid valve 108 is de-energized so that return pressure is coupled to the lock-up valve 74 and the valve member 76 is extended so that the strut locks up after a relatively longer extension stroke. A lock-up signal is provided to the solenoid valve 108 by a suitable sensor operable to detect when the aircraft is on the ground. FIG. 2 depicts one embodiment in which the sensor is a proximity sensor 110 fixed in the cylinder barrel 44 and positioned to detect when the main piston 48 is compressed into the strut past the landing hold position shown in FIG. 2. The sensor 110 provides a signal to the solenoid valve 108 so as to cause a switch to the takeoff mode shown in FIG. 6. To assure that the switch to takeoff mode does not occur during touchdown transition (and to assure that a switch to landing mode does not occur during takeoff), the signal from the proximity sensor 110 preferably is passed through a time-delay unit 112, which preferably is operable to provide a 5–10 second time delay before the signal is supplied to the solenoid valve 108.

The strut 40 also includes a recycle valve 114 in the floating piston 52 between the chambers 64 and 66, which allows the floating piston 52 to return to a raised position after landing. A pressure relief valve 116 is also provided for relief of pressure spikes that can occur during landing and taxi when the landing gear encounter holes, bumps, or the like on the runway.

After takeoff, when the landing gear 20 is to be stowed in the aircraft, it is frequently necessary to position the wheel truck 28 in a position close to horizontal to facilitate stowage of the gear. The auxiliary strut 40 preferably provides the capability of actively extending to effect such positioning of the wheel truck. To this end, the $P_{Tilt}$ source 92 is depressurized and the $P_{Stow}$ source 94 is pressurized. Thus, $P_{Stow}$ pressure is directed into the floating piston control chamber 60, causing the floating piston to extend to the end stop 72, and the pressure from the pressure-reducing valve 100 supplied to the upper hydraulic chamber 64 causes the main piston 48 to stay in contact with the floating piston 48, so that the main piston 48 is extended to its maximum extent (referred to herein as the "stow position" of the strut). This causes the strut 40 to position the wheel truck 28 in a position suitable for stowage, as shown in FIG. 5.

Figure 7:
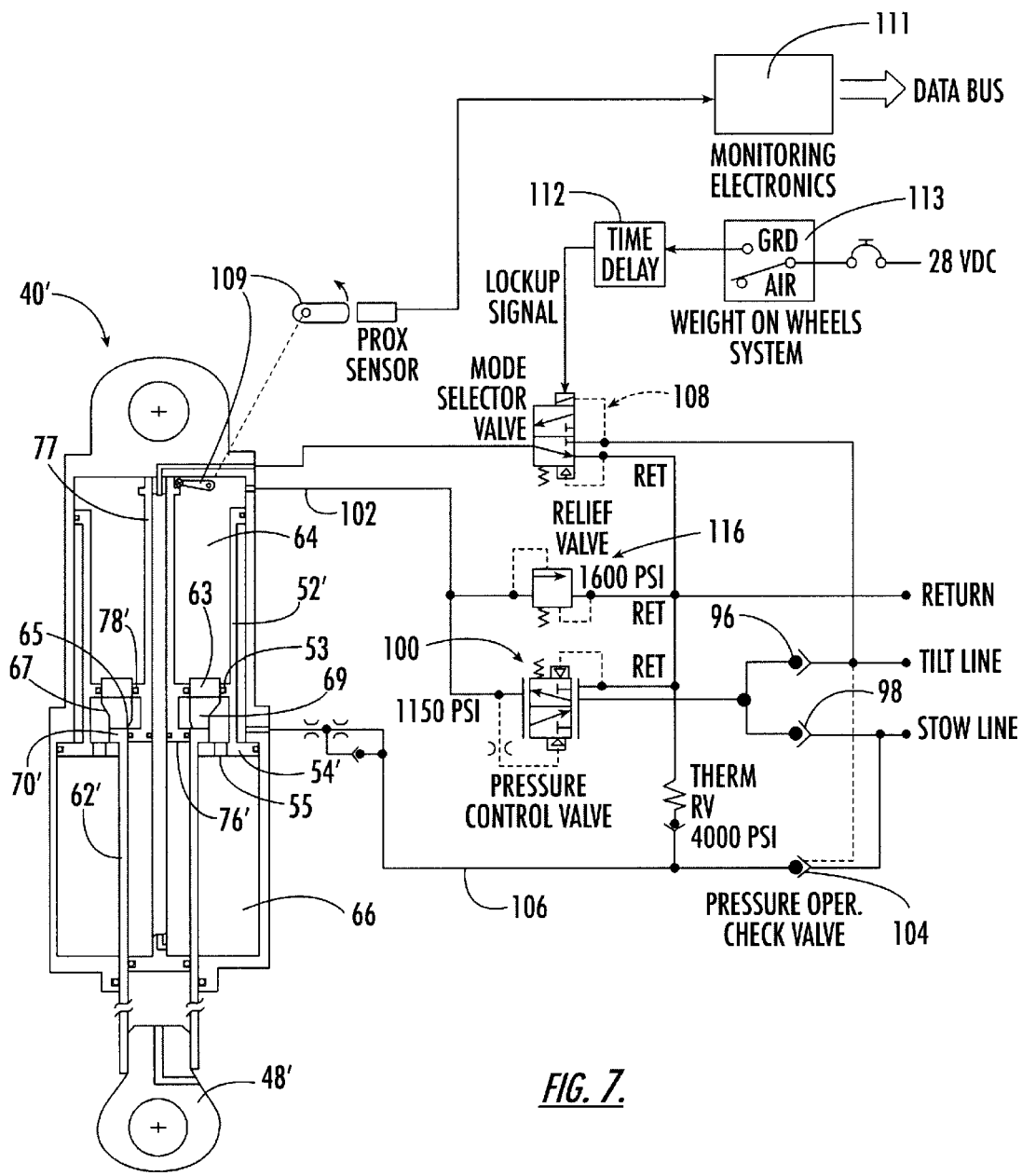
FIG. 7 is a sectioned side elevation of an alternative preferred embodiment of an auxiliary strut in accordance with the invention.

FIG. 7 depicts an alternative preferred embodiment of a strut and control system in accordance with the invention. The strut 40' of FIG. 7 is similar in most respects to the strut 40 of FIGS. 2, 3, and 6, and hence the present description of the strut 40' focuses primarily on those aspects that are different from the strut 40. The strut 40' includes a lock-up valve member 76' having an upper snubbing seal 78' on its outer periphery. Unlike the seal 78 of the lock-up valve member 76 of the previously described strut 40, the snubbing seal 78' does not maintain continuous sealing contact with the inner surface of the tubular portion 62' of the main piston 48'. Rather, the snubbing seal 78' sealingly contacts the inner surface of the tubular portion 62' only when the main piston 48' is near its lock-up position with respect to the lock-up valve member 76', as further described below. Additionally, the floating piston 52' includes a snubbing seal 53 on its inner periphery that similarly makes sealing contact with the outer surface of the tubular portion 62' only when the main piston 48' is near its lock-up position with respect to the lock-up valve member 76'.

The tubular portion 62' of the main piston 48' includes a generally annular flange portion 63 on its upper end. The flange portion 63 has an inner cylindrical surface having a diameter that is smaller than that of the rest of the tubular portion 62' and is joined therewith by an inner conical surface 65 that extends downwardly and outwardly. Similarly, the flange portion 63 has an outer cylindrical surface having a diameter that is larger than that of the rest of the tubular portion 62' and is joined with an outer conical surface 67 that extends downwardly and inwardly. The inner and outer cylindrical surfaces of the annular flange portion 63 are sized to make sealing contact with the snubbing seals 53 and 78'. The lock-up valve member 76' and the floating piston 52' are configured so that when both are fully retracted as shown in FIG. 7, the snubbing seals 53 and 78' can be simultaneously engaged by the outer and inner cylindrical surfaces of the annular flange portion 63 as shown. In this position of the strut, fluid flow between the two chambers 64 and 66 is prevented, and thus the strut is locked at a fixed length when in tension.

The tubular portion 62' of the main piston 48' includes at least one, and preferably several, slit orifices 69 that extend through the tubular portion 62' and are oriented with their lengthwise dimensions extending lengthwise along the tubular portion 62'. The slit orifices 69 preferably have their upper ends spaced below the upper end of the flange portion 63 but above the outer conical surface 67, and have their lower ends below the inner conical surface 65. Thus, when the main piston 48' is forcibly extended from an initially compressed position having the flange portion 63 disposed entirely above the snubbing seals 53 and 78' as, for example, when the aircraft is stationary on the ground, the snubbing seals 53 and 78' initially are not in contact with the tubular portion 62' of the main piston, and therefore the main piston 48' extends freely with comparatively little resistance. As the main piston further extends, the snubbing seal 78' first comes into engagement with the inner cylindrical surface of the annular flange portion 63 (and is guided into contact therewith by the conical surface 65), such that the snubbing seal 78' begins to cover a lower portion of the slit orifices 69. As the main piston 48' further extends, the snubbing seal 78' progressively covers more and more of the slit orifices 69. Next, the snubbing seal 53 makes sealing contact with the lower end of the cylindrical outer surface of the flange portion 63, which is just below the upper ends of the slit orifices 69. At this point, fluid flow through the slit orifices 69 is significantly throttled, such that further extension of the main piston 48' is substantially damped. As the main piston extends to its full extent relative to the floating piston 52' such that the flange 70' abuts the end wall 54' of the floating piston, the slit orifices 69 become fully closed by the snubbing seals 53 and 78', and the strut 40' is locked at a fixed length as shown in FIG. 7.

The snubbing seals 53 and 78' advantageously are formed by one or more rings of relatively stiff material that is sufficiently robust that the rings can tolerate repeated sliding over the conical surfaces 65 and 67 and over the slit orifices 69 without being cut or otherwise damaged, misshapen, or dislodged from their desired locations. For example, each of the snubbing seals may be formed by a solid ring of a plastic material.

The lock-up valve member 76' includes an elongate tubular portion 77 extending upwardly from the snubbing seal 78'. The lock-up valve member 76' is actuated to extend and retract by application of fluid pressure in the manner previously described in connection with the strut 40. The upper end of the tubular portion 77 is configured to engage a proximity switch 109 when the lock-up valve member 76' is in the retracted position as shown in FIG. 7, and the signal from the proximity switch 109 is provided to monitoring electronics 111 operable to monitor whether the strut 40' is in a takeoff mode (with the lock-up valve member 76' retracted) or a landing mode (with the lock-up valve member 76' extended).

The switch 109 can also be used during takeoff rotation to monitor the proper function of the auxiliary strut 40'. More particularly, if the lock-up valve member 76' moves out of position by a predetermined amount during rotation when the auxiliary strut is under heavy tension load, which may be indicative of internal damage to the strut such as seal leakage, logic contained in the monitoring electronics can identify that the strut needs maintenance.

The strut 40' is switched from one mode to the other by a signal received from an aircraft ground engagement-sensing system 113 that is operable to sense when a portion of the weight of the aircraft is supported by the landing gear. The signal from the ground engagement-sensing system 113 is fed through a time delay unit 112 to a solenoid valve 108 that operates as previously described in connection with the strut 40. Thus, the signal that initiates a mode change originates external to the strut 40' rather than within the strut.

Thus far, the description of the landing gear and control system of the invention is in accordance with the description in U.S. Pat. No. 6,182,925, which has been incorporated herein by reference. The present invention provides an improvement over the control system described in the '925 patent. More particularly, the control system and method of the present invention monitors and controls the locking of the auxiliary strut 40 based on signals from the strut proximity sensor 109 and based on both a ground mode sensor (e.g., weight-on-wheels sensor 113) and one or more additional sensors that provide an indication to the control system as to whether the aircraft is operating in a takeoff mode or not. In this regard, it is desirable for the auxiliary strut 40 to lock up only when the aircraft is in a takeoff roll, but to remain unlocked for all other operating conditions. If the locking were controlled based solely on a ground mode sensor, then locking may occur during ground operations in which it is not desirable to have the strut lock up, such as during ground tests of the engines, during taxi, or during rollout following landing.

Figure 8:
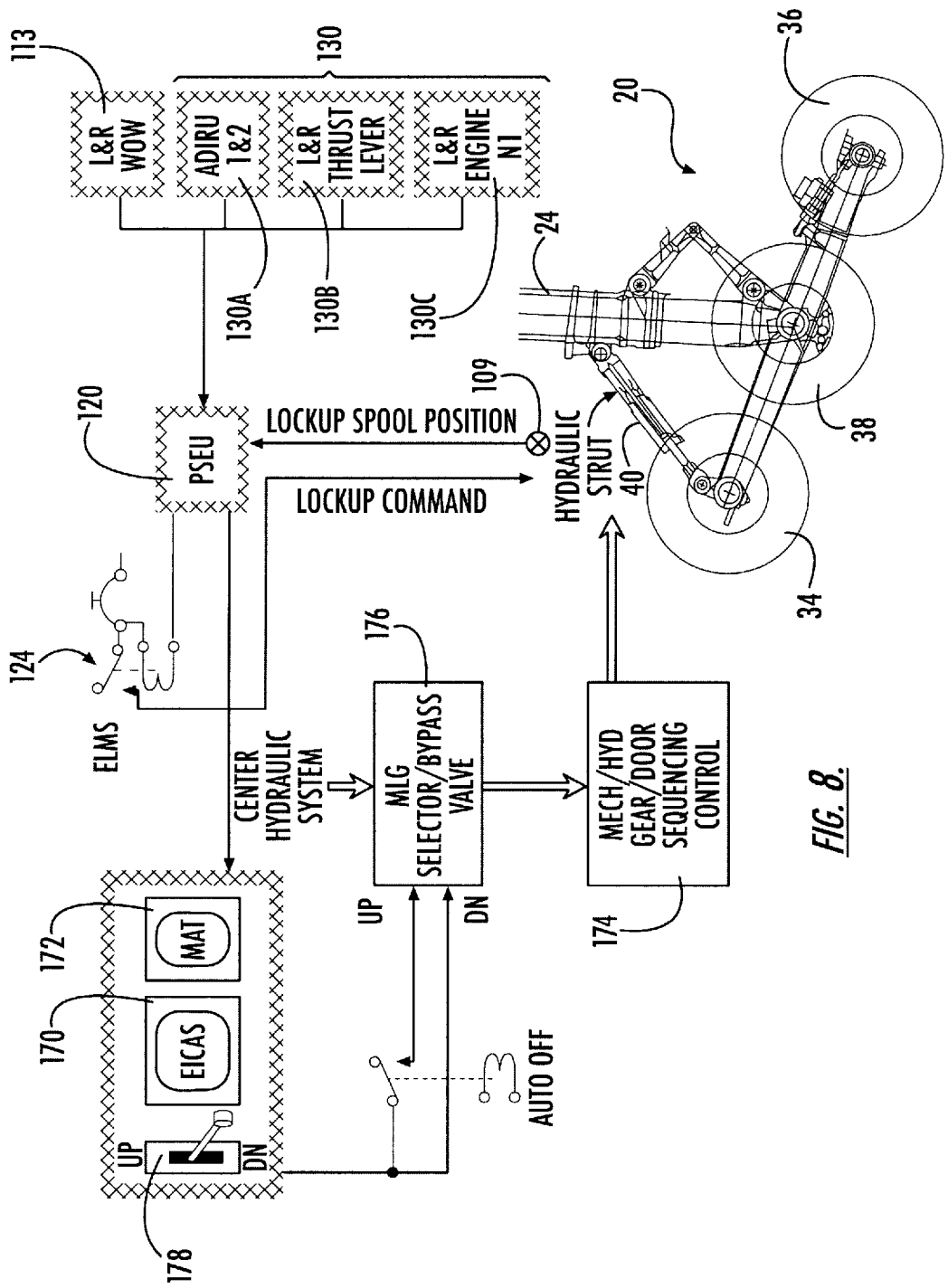
FIG. 8 is a side elevation of a landing gear in accordance with the present invention, and also schematically depicting a control system in accordance with one embodiment of the invention.

Accordingly, the control system and method of the present invention employs additional takeoff mode sensors for detecting whether the aircraft is in a takeoff roll or not. FIG. 8 depicts a diagrammatic view of the entire landing gear and auxiliary strut system including the auxiliary strut control system in accordance with a preferred embodiment of the invention. The control logic is embodied in a proximity sensor electronics unit (PSEU) 120, also referred to herein as an auxiliary strut control unit, which encompasses the monitoring electronics 111 and time delay unit 112 previously referred to in connection with FIG. 7, as well as additional functions as described below. The PSEU 120 is connected with the strut proximity sensor 109 for monitoring the condition of the strut 40 as to whether it is locked or unlocked. The PSEU 120 is also connected to a relay 124 that is activatable by the PSEU to send a lock-up command signal to the auxiliary strut 40 when the control logic determines that the aircraft is in a takeoff roll.

The PSEU 120 determines whether the aircraft is in a takeoff roll based on signals from ground mode sensors 113, which preferably comprise left and right weight-on-wheels (WOW) sensors, and from takeoff mode sensors 130. The takeoff mode sensors include ground speed sensors 130A (e.g., first and second air data inertial reference units (ADIRU)). The ground speed sensors detect the speed of the aircraft in an inertial reference system, i.e., the ground speed of the aircraft, and communicate this information to the PSEU 120. The takeoff mode sensors also include left and right thrust lever sensors 130B for detecting the positions of the left and right thrust levers in the aircraft cockpit, which control the left and right engines. Of course, if the aircraft has a different number of engines and associated thrust levers, there can be a corresponding number of thrust lever sensors. The thrust lever sensors 130B send signals to the PSEU 120 indicative of the positions of the thrust levers. The takeoff mode sensors further include engine speed sensors 130C for detecting the fan speed (commonly referred to as N1) at which each of the engines is operating. The engine speed sensors send signals to the PSEU indicative of the fan speed of each engine.

Based on the signals from the takeoff mode sensors 130 and ground mode sensor 113, the PSEU 120 can determine whether or not the aircraft is in a takeoff roll. In this regard, a takeoff roll will be characterized by the ground mode sensors 113 indicating that the aircraft is on the ground, the ground speed sensors 130A indicating that the aircraft is traveling at an appreciable speed, the thrust lever sensors 130B indicating that the thrust levers have been advanced to a takeoff setting, and the engine speed sensors 130C indicating that the engines are operating at a relatively high speed. Thus, the PSEU is programmed to issue a lock-up command to the auxiliary strut if and only if each of these criteria are satisfied.

Figure 9:
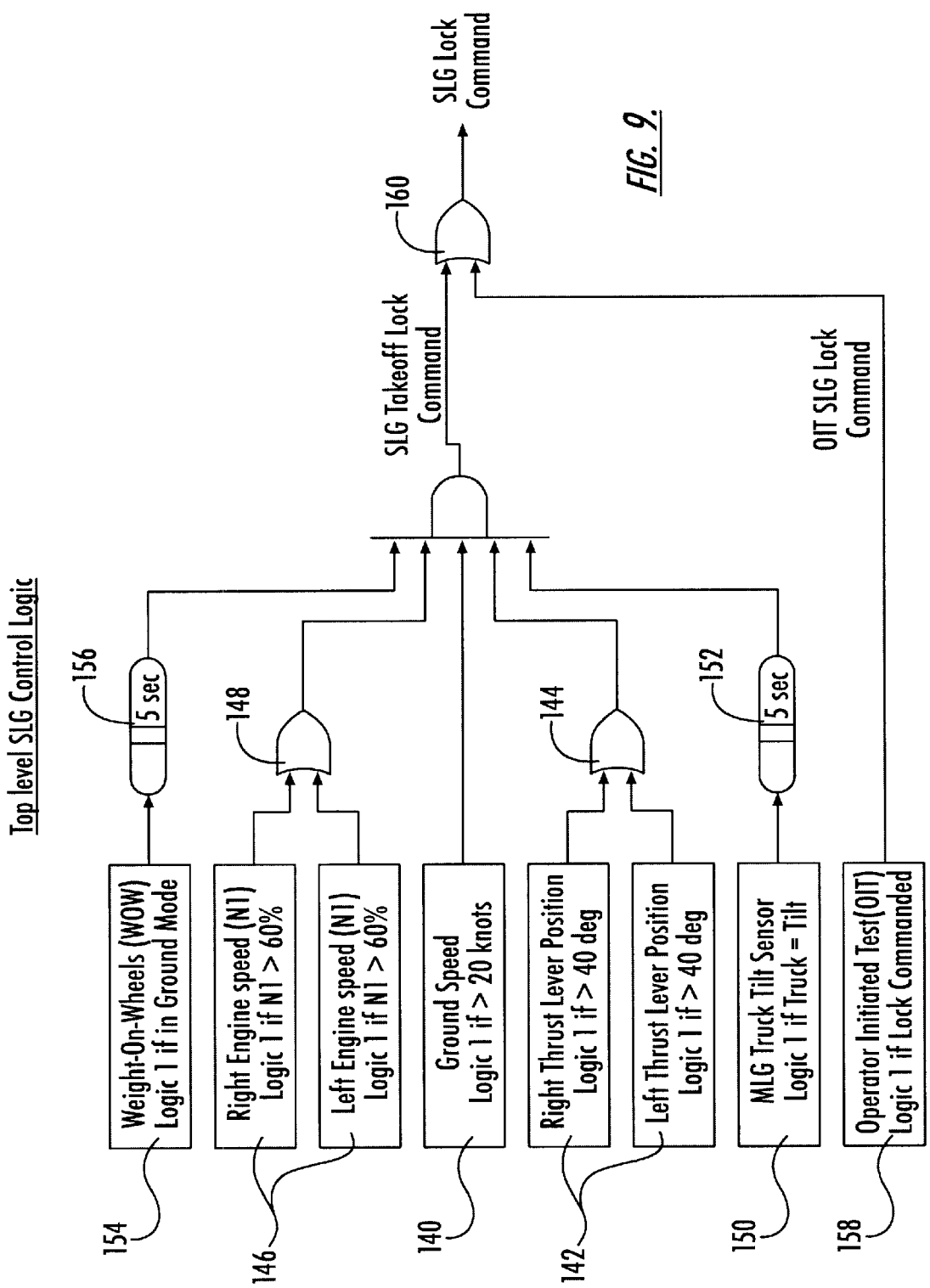
FIG. 9 is a top-level control diagram for the auxiliary strut control unit in accordance with a preferred embodiment of the invention.

More particularly, in a preferred embodiment, the lock-up command will be issued only if the computed ground speed exceeds a predetermined level, such as 20 knots, as indicated at 140 in the control diagram of FIG. 9. With respect to the thrust lever positions, the lock-up command will be issued only if at least one of the left and right thrust levers has been advanced beyond a predetermined position, such as 40 degrees, as shown at 142 in FIG. 9, thus indicating that the aircraft is in a throttled-up condition. An OR gate 144 processes the signals from the thrust lever sensors such that a logic value of "1" is passed to the control logic if either or both of the thrust lever sensors yield a logic value of "1" to the OR gate.

Furthermore, a lock-up command will be issued only if at least one of the engine speed sensors indicates a fan speed exceeding a predetermined level, such as 60 percent fan speed, as shown at 146 in FIG. 9. The signals from the engine speed sensors are processed through an OR gate 148 such that a logic value of "1" is passed to the control logic if either or both of the engine speed sensors yield a logic value of "1".

The takeoff mode sensors thus enable the control logic to distinguish between a takeoff roll and other ground operational modes. For instance, during a ground engine test, the thrust levers will be advanced beyond 40 degrees and the engine speeds may exceed 60 percent, but the ground speed of the aircraft will not exceed 20 knots, and thus the auxiliary strut is not commanded to lock up. Additionally, during a rollout following landing, the ground speed will exceed 20 knots, but the thrust levers typically will be pulled back to below 40 degrees, and thus the auxiliary strut is not commanded to lock up. When taxiing, the ground speed may exceed 20 knots, but the thrust levers typically will be below 40 degrees and the engine speeds will be below 60 percent, thus preventing the strut from locking up.

Additional parameters and logic can be added to the control logic to comply with failure probability requirements. For instance, as shown at 150 in FIG. 9, a truck tilt sensor can be included in the control system for detecting whether or not the landing gear truck is in a tilted orientation as shown in FIG. 8. In this regard, typically the truck is placed in the tilted orientation during approach prior to touchdown so that the aft wheels are first to make contact with the runway. If a logic value of "1" is yielded from the output of the truck tilt sensor, thus indicating that the truck is tilted, the control logic can disable the lockup command so that the auxiliary strut is unlocked; if a logic "0" is passed to the control logic, no disabling of the lockup is performed. This feature is included to reduce the probability of the aircraft touching down with the auxiliary strut locked, which is undesirable because it would lengthen the time required to get all wheels of the main gear on the ground and hence would reduce braking effectiveness on landing. The logic value from the truck tilt sensor is processed through a time delay unit 152 so that disabling of the lockup command occurs only if the logic "1" value from the truck tilt sensor exists continuously for a predetermined period of time, such as 5 seconds.

It should also be noted that the logic value from the ground mode sensor, indicated at 154 in FIG. 9, is processed through a time delay unit 156 so that any logic value must exist continuously for a predetermined period of time, such as 5 seconds, before the control logic will lock or unlock the auxiliary strut. Thus, for example, when the aircraft lifts off from the ground on takeoff, the logic value from the ground mode sensor will change from "1" to "0", but the command to unlock the auxiliary strut will not be issued until the predetermined time period set by the time delay unit 156 has elapsed.

If desired, the control system can include provisions for allowing ground maintenance personnel to test the locking operation of the system. Thus, as indicated at 158 in FIG. 9, the system can include an operator initiated test (OIT) unit by which an operator can push a button or operate a switch so as to send a signal to cause the auxiliary strut to be locked up. The logic value from the OIT unit is processed through an OR gate 160, which also receives the logic value from the ground and takeoff mode control logic, such that the final command to lock the auxiliary strut is issued if either logic value is "1", and otherwise the strut is unlocked.

Redundancy can be built into the control system to reduce failure probabilities. In this regard, preferably the auxiliary strut for each of the left and right main landing gear of the aircraft is controlled by its own separate PSEU 120. This reduces the probability of a single failure causing the loss of function of both auxiliary struts on takeoff.

Furthermore, each PSEU 120 can include two redundant control circuits each processing the signals from the various sensors. The outputs from the two circuits can be processed through an OR gate such that the final output from the PSEU will provide a command to lock the auxiliary strut if either circuit yields a lock command.

This redundant design approach can be extended also to the control logic signals from the ground mode and takeoff mode sensors, as previously noted in connection with FIG. 9.

With reference again to FIG. 8, each PSEU 120 preferably provides status information to an airplane information management system (AIMS), which includes an engine indication crew alerting system (EICAS) 170 that displays messages on a multifunctional display in the cockpit to alert the crew as to various indications and faults in various systems of the aircraft. More particularly, each PSEU preferably provides fault indications to the EICAS 170 if the auxiliary strut, on the previous flight, failed to lock when commanded, or failed to hold in the locked configuration during takeoff, or failed to unlock when commanded, or locked when not commanded Preferably, the "failed to lock" fault indication is generated by the PSEU and displayed to the crew in the cockpit if, within a prescribed period of time (e.g., 8 seconds) after a lock-up command has been sent to the auxiliary strut, the signal from the proximity sensor 109 of the strut does not indicate that the strut has locked for at least a prescribed minimum period of time (e.g., one second). The "failed to hold" fault indication is generated and displayed if the proximity sensor signal changes from a target near state (indicative of a locked condition) to a target far state (indicative of an unlocked condition) from more than a prescribed period of time (e.g., one second) while a lock-up command exists. The "failed to unlock" fault indication is generated and displayed if the proximity sensor signal indicates a target near state for more than a prescribed period of time (e.g., one second) after an unlock command has been issued. The "locked when not commanded" fault indication is generated and displayed if the proximity sensor signal indicates a target near state for more than a prescribed period of time (e.g., one second) during a time when an unlock command has existed for more than a prescribed period of time (e.g., 3 seconds).

These fault indications preferably are also provided to a maintenance access terminal (MAT) 172 that is accessed by maintenance personnel during ground maintenance procedures, so that such personnel will be apprised of any faults occurring in the auxiliary strut system.

On large commercial aircraft, typically the main landing gear are retractable into landing gear bays in the aircraft. The gear bays typically include doors that are opened for extending the gear and closed when the gear are retracted and stowed. The gear are extended and retracted and the bay doors are opened and closed by a gear/door sequencing control 174 that is hydraulically operated by pressurized hydraulic fluid supplied from a gear selector/bypass valve 176 connected with a central hydraulic system of the aircraft. The gear selector/bypass valve 176 is operated by an electrical signal from a landing gear lever 178 in the cockpit. When the landing gear lever is positioned in an "up" position, the landing gear are retracted and stowed in the gear bays and the bay doors are closed; when the lever is moved to the "down" position, the bay doors are opened and the landing gear are extended. In accordance with one embodiment of the invention, a signal indicative of the position of the landing gear lever 178 can be sent to the PSEU 120; if the landing gear lever 178 is moved to the "up" position, the PSEU can immediately command the auxiliary strut to unlock; if the lever is moved to the "down" position the PSEU can command the strut to lock as long as the other criteria for locking are satisfied as previously described. However, in the currently preferred embodiment, the landing gear lever position is not taken into account by the PSEU.

Figure 10:
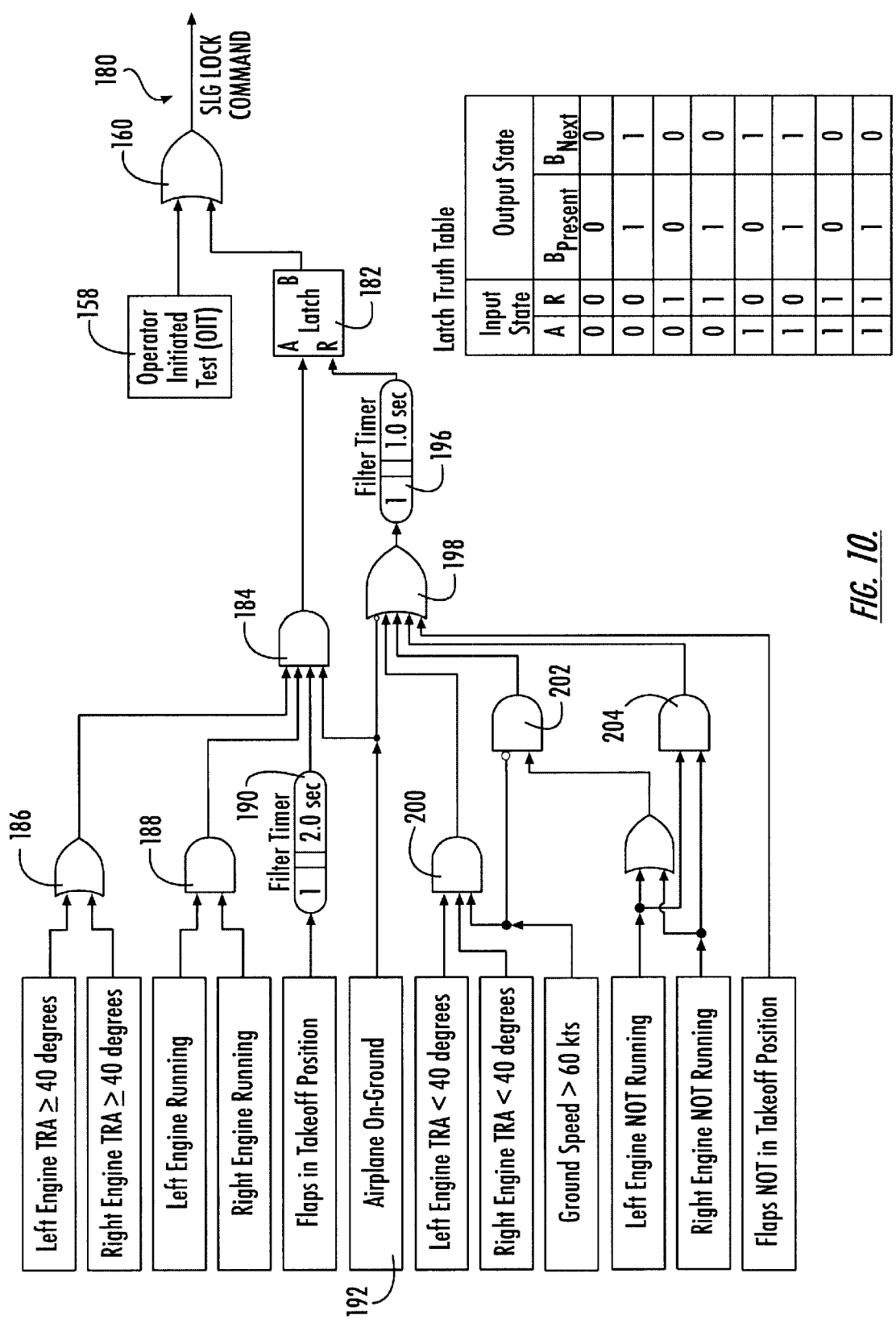
FIG. 10 is a control diagram for the auxiliary strut control unit in accordance with another preferred embodiment of the invention.
Figure 11:
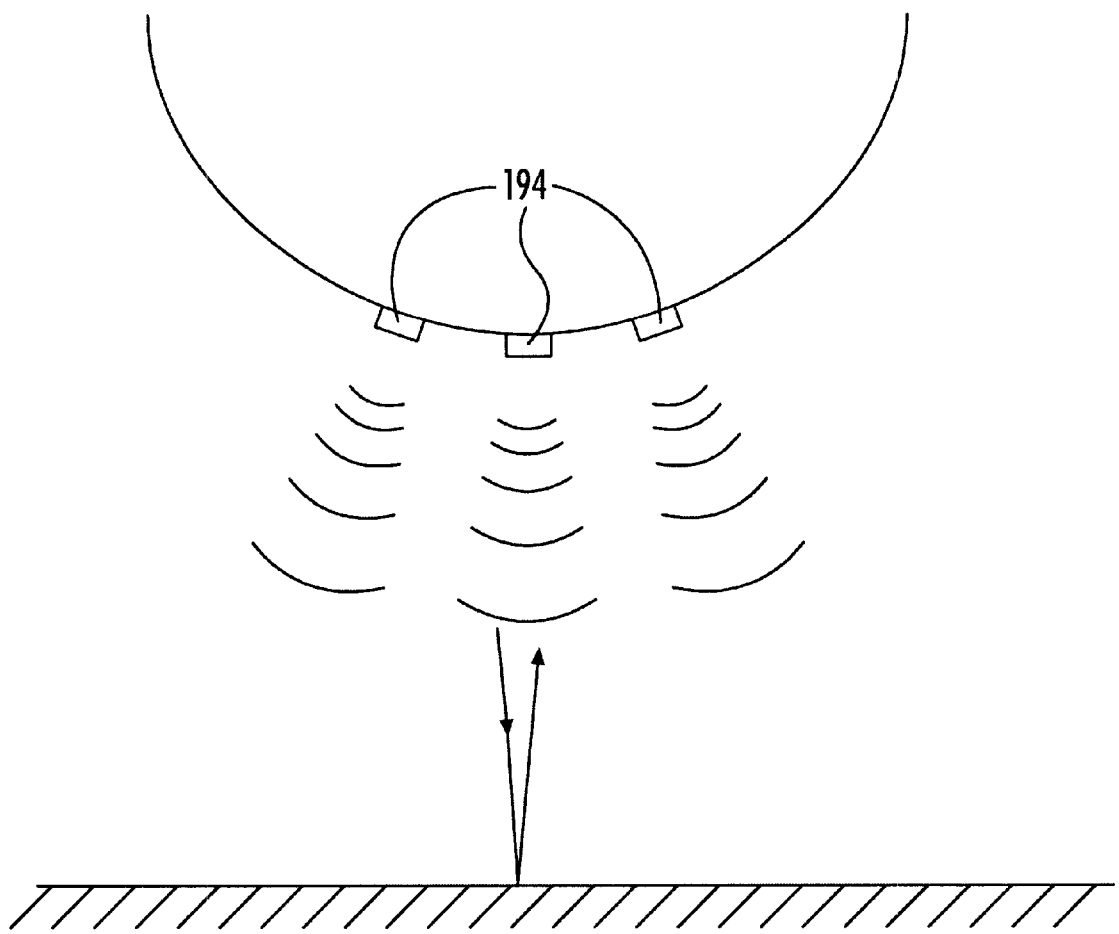
FIG. 11 is a schematic fragmentary front view of the lower portion of an aircraft fuselage having radio altimeters mounted thereon.

FIG. 10 depicts a control diagram for an alternative embodiment of the invention. As indicated at 180, a lock-up discrete (i.e., a logical value of "1" for commanding lockup or "0" for commanding unlock) is provided depending on the output state from a latch 182. The truth table for the latch 182 is shown in the lower right corner of FIG. 10. An input "A" and an input "R" are provided to the latch, and depending on the logic state of the inputs, the output "B" from the latch can be either "1" or "0". The input "A" is created in the lock-up logic of the control, such that a logical value of "1" for input "A" indicates that the criteria for locking the auxiliary strut are satisfied and a value of "0" indicates that the locking criteria are not satisfied. The input "R" is created in the unlock logic, such that a logical value of "1" for input "R" indicates that the criteria for unlocking are satisfied and a value of "0" indicates that the unlocking criteria are not satisfied.

With respect to the lock-up logic, the input "A" to the latch is provided by an AND gate 184. The output from the AND gate 184 will be a logical value of "1" when each of the inputs into the gate is a logical value of "1"; otherwise the output will be a logical "0". One of the inputs to the gate 184 is from an OR gate 186, which provides an output of "1" if either the left engine thrust resolver angle (i.e., power lever position) is greater than or equal to 40 degrees or the right engine thrust resolver angle is greater than or equal to 40 degrees, thus indicating that the aircraft may be in a takeoff roll. Another input to the AND gate 184 is from an AND gate 188, which provides an output of "1" if both the left and right engines are running. A third input to the AND gate 184 is provided from a filter timer 190, which provides an output of "1" if the aircraft flaps are in takeoff position for a duration of at least 2.0 seconds; the switch back to the logical "0" state is not delayed, however, such that as soon as the flaps are not in the takeoff position the filter timer provides a logical "0" output. The remaining input to the AND gate 184 is from the aircraft-on-ground logic 192, which is explained further below.

The aircraft-on-ground logic 192 in accordance with the present embodiment preferably utilizes signals from one or more radio altimeters 194 mounted adjacent the underside of the aircraft fuselage, typically just behind the front nose gear of the aircraft. Each radio altimeter emits radio signals downwardly, and the signals bounce off the ground and are reflected back up to the aircraft. The altimeter receives the reflected signal and computes the height of the altimeter from the ground based on the time delay between the transmitted and received signals. The altimeter is usually calibrated so that it reads zero when the main landing gear of the aircraft just touch down on landing, at which point the nose wheel of the aircraft is still some distance off the ground, and hence the altimeter is higher than when all wheels are on the runway. Thus, when the nose wheel touches down and the aircraft is in a landing roll, the altimeter will read a negative height, about −8 to −10 feet, for example. In this case, if any of the altimeters indicates a height of less than, say, −5 feet, this will be an indication that the aircraft is on the ground.

Thus, the aircraft-on-ground logic 192 determines that the aircraft is on the ground if any of the following conditions is satisfied for a predetermined length of time (e.g., 5 seconds): (1) data from all three altimeters 194 are available and any two altimeters indicate a height less than or equal to a predetermined lower limit (e.g., −5 feet); or (2) data from one or two altimeters are unavailable but at least one altimeter indicates a height less than or equal to the predetermined lower limit; or (3) data from all altimeters are unavailable. The third condition is used when the altimeters are located just behind the nose gear of the aircraft. In this situation, if data from all three altimeters are unavailable (and since simultaneous failure of all three is highly unlikely), it most likely indicates that the aircraft is in a takeoff roll on a runway covered by water or slush, which is thrown up by the nose wheel and thus swamps the altimeters. The on-ground condition remains true until the in-air logic is satisfied.

The in-air logic, which for present purposes is considered to be part of the aircraft-on-ground logic 192, determines that the aircraft is in the air if any of the following conditions is satisfied for a predetermined length of time (e.g., 5 seconds): (1) data from all three altimeters 194 are available and any two altimeters indicate a height greater than a predetermined upper limit (e.g., 15 feet); or (2) data from one or two altimeters are unavailable, and all available altimeters indicate a height greater than the predetermined lower limit and at least one altimeter indicates a height greater than the predetermined upper limit. The in-air condition remains true until the on-ground logic is satisfied.

Thus, in accordance with this embodiment, the auxiliary strut is commanded to lock if each engine is running, flaps are in the takeoff position for more than a predetermined length of time (e.g., 2 seconds), the aircraft is on the ground, and any engine power lever is advanced past a predetermined limit (e.g., 40 degrees). The command to lock remains until the unlock logic is satisfied.

Referring again to FIG. 10, with respect to the unlock logic, the input "R" to the latch 184 is provided from a filter timer 196 that outputs a logical "1" if the input to the timer is a logical "1" for at least 1.0 second. The input to the timer is provided by an OR gate 198 having five inputs. If any one or more of the five inputs has a certain defined state then the OR gate 198 outputs a "1", and otherwise outputs a "0". One input to the OR gate 198 is from the aircraft-on-ground logic 192, which as noted above outputs a "1" of the aircraft is on the ground and a "0" if the aircraft is in the air. The OR gate 198 outputs a "1" if the input from the aircraft-on-ground logic is "0".

Another input to the OR gate 198 is provided by an AND gate 200, which outputs a "1" if both engine thrust resolver angles are pulled back below 40 degrees and the aircraft ground speed is greater than 60 knots, and otherwise outputs a "0". A third input to the OR gate 198 is provided from an AND gate 202, which outputs a "1" if the aircraft ground speed is less than or equal to 60 knots and either the right or left engine (or both) is not running, and otherwise outputs a "0". A fourth input to the OR gate 198 is from an AND gate 204, which outputs a "1" if both engines are not running and otherwise outputs a "0". The final input to the OR gate 198 is a logical "1" if the flaps are not in the takeoff position, and otherwise is a "0".

Thus, the auxiliary strut is commanded to unlock if any of the following conditions persists for more than a predetermined length of time (e.g., 1 second): (1) the aircraft is in the air; or (2) each engine power lever is pulled back below a predetermined limit (e.g., 40 degrees) and the aircraft ground speed is greater than a predetermined limit (e.g., 60 knots); or (3) any engine is not running and the aircraft ground speed is less than the predetermined limit (e.g., 60 knots); or (4) all engines are not running; or (5) flaps are not in the takeoff position. The unlock command remains until the lock logic is satisfied, even if some of the above conditions are no longer satisfied.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A control method for controlling a tiltable truck of a main landing gear of an aircraft so that the main landing gear can function as a semi-levered gear during certain prescribed conditions, the control method comprising:

providing a fluid-operated auxiliary strut connected between a bogie beam of the truck and a main strut of the landing gear, a lower end of the main strut being pivotally connected to the bogie beam at a main pivot and the auxiliary strut being connected to the bogie beam at a location spaced along the bogie beam from the main pivot, the auxiliary strut being operable to lock up upon receipt of a lock-up command signal such that a length of the auxiliary strut is fixed at a predetermined length;

detecting when the aircraft is in a takeoff roll; and if the aircraft is detected as being in a takeoff roll, issuing a lock-up command signal to the auxiliary strut so as to lock up the strut at the predetermined length and cause the main landing gear to function as a semi-levered gear.

2. The control method of claim 1, wherein the step of detecting when the aircraft is in a takeoff roll includes detecting that the aircraft is on the ground.

3. The control method of claim 1, wherein the step of detecting when the aircraft is in a takeoff roll includes detecting when the aircraft is traveling at a ground speed exceeding a predetermined limit.

4. The control method of claim 1, wherein the step of detecting when the aircraft is in a takeoff roll includes detecting when any of the aircraft's engines is operating at a speed exceeding a predetermined limit.

5. The control method of claim 1, wherein the step of detecting when the aircraft is in a takeoff roll includes detecting when an engine thrust lever is advanced beyond a predetermined limit.

6. The control method of claim 1, wherein the step of detecting when the aircraft is in a takeoff roll includes detecting when flaps of the aircraft are in a takeoff position.

7. The control method of claim 1, wherein the step of detecting when the aircraft is in a takeoff roll includes detecting that any engine thrust lever is advanced beyond a predetermined limit, that all engines are running, that flaps are in a takeoff position, and that the aircraft is on the ground.

8. The control method of claim 1, further comprising unlocking the auxiliary strut upon detecting that the aircraft is not on the ground.

9. The control method of claim 1, further comprising unlocking the auxiliary strut upon detecting that an engine thrust lever has been pulled back below a predetermined limit.

10. The control method of claim 1, further comprising unlocking the auxiliary strut upon expiration of a predetermined time period following liftoff of the aircraft from the ground.

11. The control method of claim 1, further comprising unlocking the auxiliary strut upon detecting that a command has been issued to retract the main landing gear.

12. The control method of claim 1, further comprising unlocking the auxiliary strut upon detecting that flaps of the aircraft are not in a takeoff position.

13. A control system for controlling a tiltable truck of a main landing gear of an aircraft so that the main landing gear can function as a semi-levered gear during certain prescribed conditions, the truck including a bogie beam supporting wheels at forward and aft positions thereof, the landing gear including a main strut a lower end of which is pivotally connected to the bogie beam at a main pivot, the control system comprising:

an auxiliary strut comprising a hydraulic cylinder connected between the bogie beam and the main strut, the auxiliary strut being connected to the bogie beam at a location spaced along the bogie beam from the main pivot, the auxiliary strut being operable to lock up upon receipt of a lock-up command signal such that a length of the auxiliary strut is fixed at a predetermined length;

a ground mode system operably connected with the aircraft for detecting and providing signals indicative of when the aircraft is on the ground;

a takeoff mode system operably connected with the aircraft for detecting and providing signals indicative of when the aircraft is operating in a throttled-up takeoff mode; and an auxiliary strut control unit operably connected with the ground mode system, takeoff mode system, and auxiliary strut, the auxiliary strut control unit being operable to issue a lock-up command signal to the auxiliary strut upon detecting signals from the ground mode and takeoff mode systems indicating that the aircraft is on the ground and that the aircraft is operating in a throttled-up takeoff mode, whereby the auxiliary strut is caused to lock up during a takeoff roll but is unlocked during other operating modes of the aircraft.

14. The control system of claim 13, wherein the ground mode system comprises a weight-on-wheels sensor.

15. The control system of claim 13, including at least one altimeter on the aircraft operable to measure a distance from the altimeter to the ground.

16. The control system of claim 13, including an engine speed sensor operable to detect when any of the aircraft's engines is operating above a predetermined speed.

17. The control system of claim 13, including a thrust lever sensor operable to detect when any of the thrust levers for the aircraft's engines is advanced beyond a predetermined limit.

18. The control system of claim 13, including a ground speed sensor operable to detect a ground speed of the aircraft.

19. The control system of claim 13, including an engine sensor operable to detect an operating condition of an engine of the aircraft, a thrust lever sensor operable to detect a position of a thrust lever of the aircraft, and a ground speed sensor operable to detect a ground speed of the aircraft.

20. The control system of claim 13, wherein the takeoff mode system is operable to determine whether flaps of the aircraft are in a takeoff position.

21. The control system of claim 13, wherein the auxiliary strut control unit includes two redundant circuits each processing signals from the ground mode and takeoff mode systems and producing a lock-up command signal, the two lock-up command signals from the two redundant circuits being processed through an OR gate to produce a final lock-up command signal to the auxiliary strut, whereby the auxiliary strut is commanded to lock up if and only if at least one of the redundant circuits produces a lock-up command signal.

22. The control system of claim 13, further comprising a truck tilt sensor operable to detect and provide a signal indicative of when the truck of the landing gear is in a tilted orientation for touchdown during landing, the auxiliary strut control unit receiving the signal from the truck tilt sensor and causing the auxiliary strut to remain unlocked as long as the truck tilt sensor indicates the truck is in the tilted orientation, whereby the auxiliary strut is prevented from locking up during touchdown.

23. The control system of claim 13, wherein the auxiliary strut is operable to be hydraulically extended and retracted between maximum and minimum lengths, the predetermined length at which the auxiliary strut locks up being between the maximum and minimum lengths.

24. The control system of claim 13, further comprising a strut sensor operably connected with the strut and with the auxiliary strut control unit for detecting and providing signals indicative of when the auxiliary strut is in a locked-up condition and when the strut is in an unlocked condition, the auxiliary strut control unit being operable to provide a fault indication if the auxiliary strut fails to lock when commanded.

25. The control system of claim 24, wherein the auxiliary strut control unit is operable to provide a fault indication if the auxiliary strut fails to remain locked during rotation of the aircraft upon takeoff.

26. The control system of claim 24, wherein the auxiliary strut control unit is operable to provide a fault indication if the auxiliary strut fails to unlock when commanded.

27. The control system of claim 24, wherein the auxiliary strut control unit is operable to provide a fault indication if the auxiliary strut locks when not commanded.

* * * * *